Patented Nov. 30, 1937

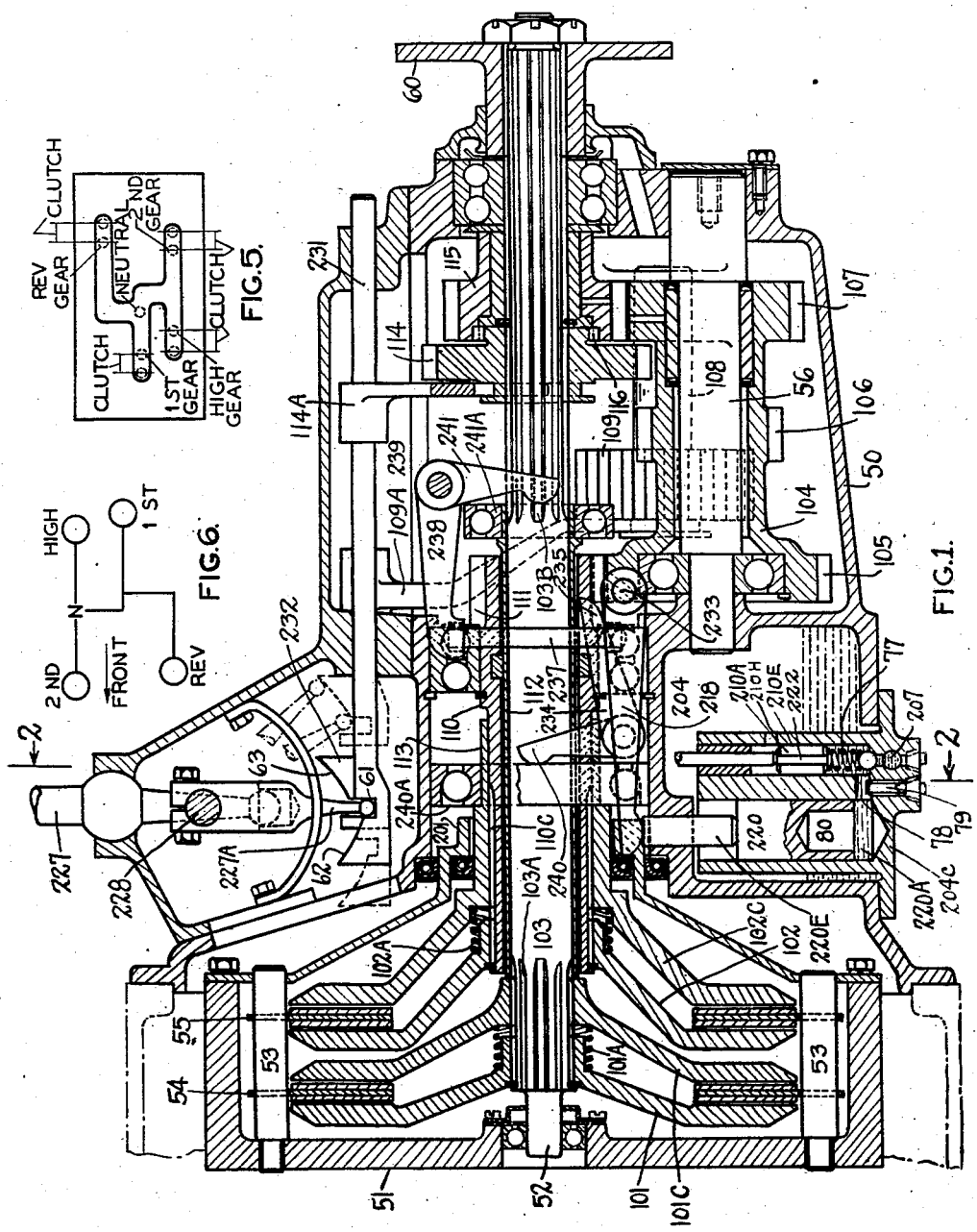

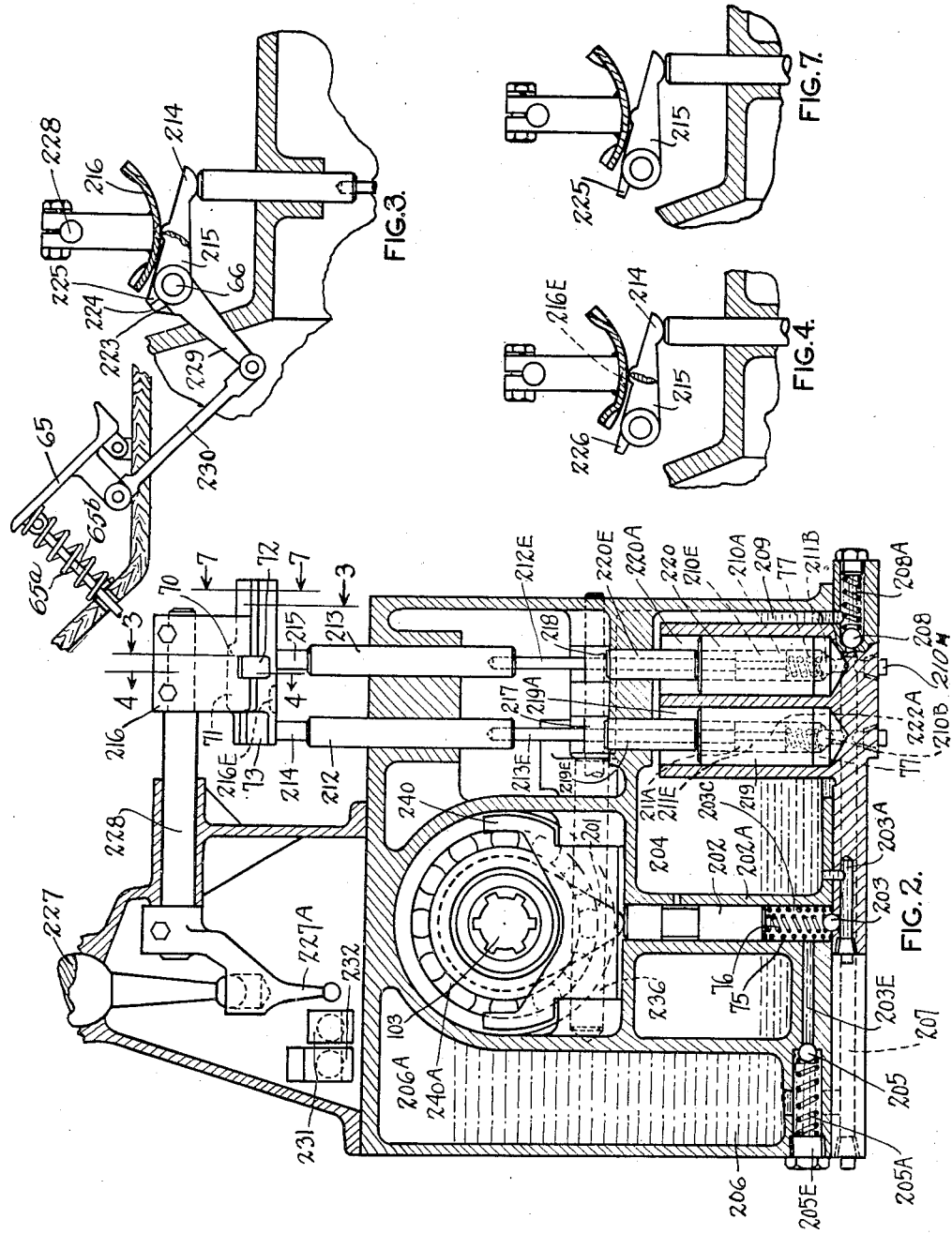

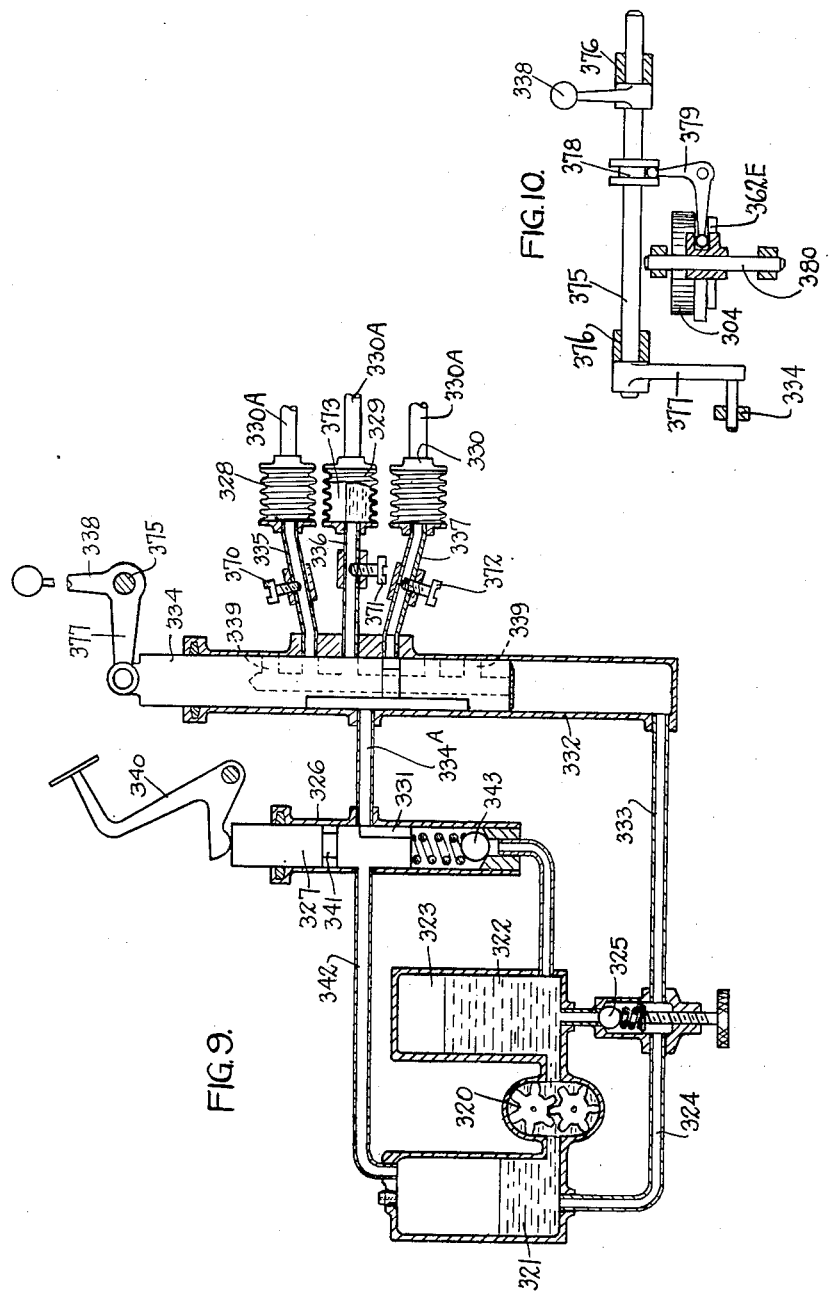

2,100,810

UNITED STATES PATENT OFFICE 2,100,810

TRANSMISSION

William T. Livermore, Westfield, N. J.

Application January 5, 1932, Serial No. 584,812

14 Claims. (Cl. 192—.01)

This invention relates to transmissions and in particular to a type adapted for use in connection with an automotive vehicle.

Among the most important objects of my invention are means for operating a transmission which will eliminate any interruption of power flow from an engine to the wheels of the vehicle during speed changes thus giving faster and smoother pick-up. Also means are provided whereby the speeds may be changed noiselessly and easily at any combination of car and engine speed. Means are also provided for free wheeling in all speeds; entire elimination of the foot clutch, dual operations of engaging or disengaging the clutch with the foot and the hand shifting of the gears, are combined into a single hand operation of the conventional shifter lever.

A still further object of my invention is the provision of means of operating that is as efficient as a conventional gear transmission and embodies the advantages of the gas electric, synchro-mesh, and free wheeling with none of their disadvantages and at a lower cost than synchro-mesh plus free wheeling.

Changes and variations may be made in the construction shown and described without departing from the principles of the invention or sacrificing its chief advantages; hence such invention is not to be confined to the structures shown in the accompanying drawings; in which;

Figure 1 is a view in section of a transmission constructed in accordance with my invention.

Figure 2 is a view in cross section taken substantially on the line 2—2 of Figure 1, the same illustrating the pressure means for engaging the clutches, the pump and the speed shift arrangement.

Figure 3 is a section taken on the line 3—3 of Figure 2 and illustrates the free wheeling feature and the valve control cam for permitting selective operation of the clutches.

Figure 4 is a section taken on the line 4—4 of Figure 2, the illustration being similar to the illustration of the valve control cam illustrated in Figure 3.

Figure 5 is a plan view of the lever guide plate employed in connection with the gear shift lever.

Figure 6 illustrates diagrammatically the conventional lever shift in connection with my transmission.

Figure 7 is a section taken on the line 7—7 of Figure 2.

Figure 9 is a diagrammatic view of the hydraulic operating mechanism used in connection with the transmission illustrated in Figure 8.

Figure 10 is a plan view of the mechanism connected with the shift lever illustrated in Figure 9.

Figure 8:
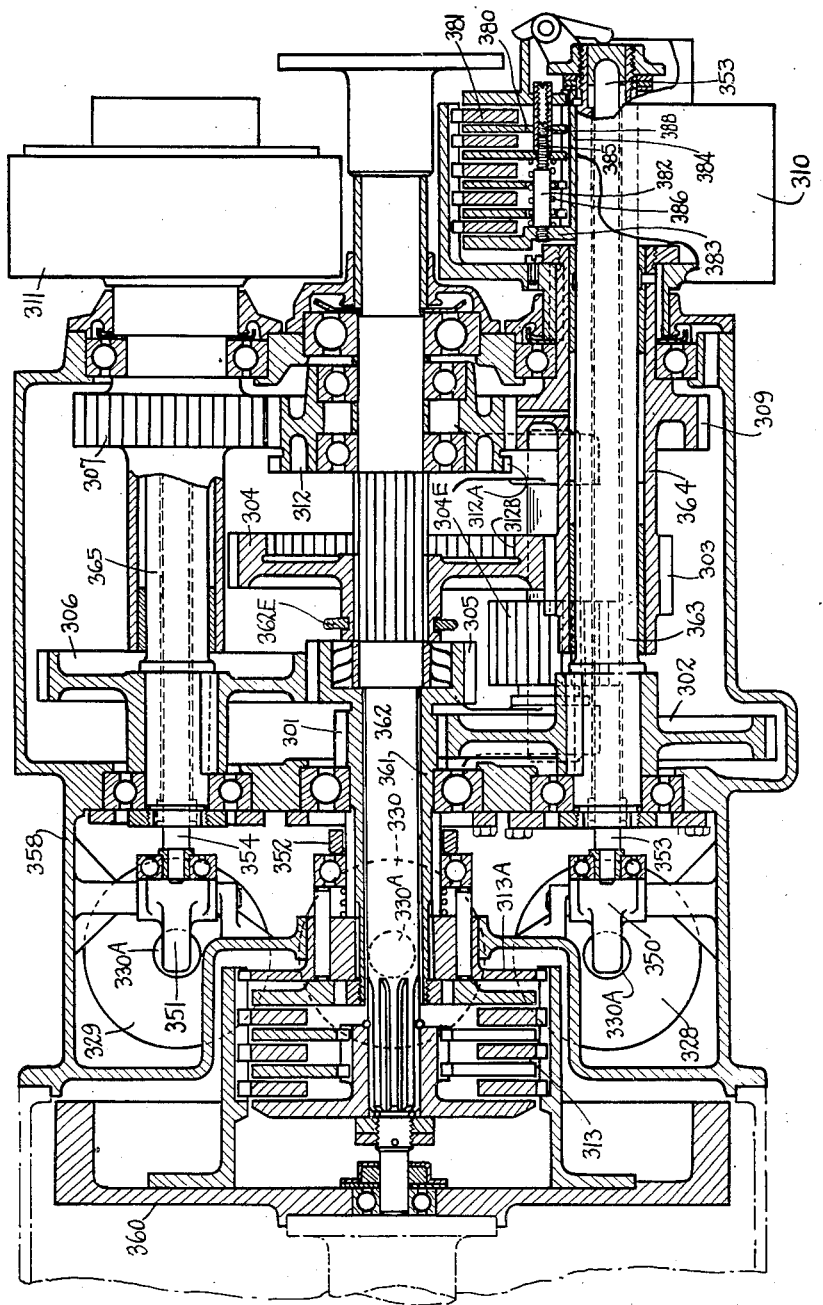
Figure 8 is a view in sectional elevation of a modified form of my invention.

Referring to the drawings in detail, 50 indicates the transmission housing at one end of which operates the fly wheel 51 connected to the motor shaft in the usual manner. The fly wheel receives the reduced end 52 of a drive shaft 103, further reference to which will be made hereinafter. The opposite sides of the flywheel structure are arranged to support between them, the disk pins 53 carrying slidably, the friction clutch rings 54 and 55 which are disposed between the clutch disks, the ring 54 being disposed between the clutch disks 101 and 101—C and the ring 55 being disposed between the clutch disks 102 and 102—C, the parts 101—C and 102—C being movable as will be hereinafter described to have operative engagement with the friction clutch rings 54 and 55 respectively.

The clutch disk elements 101 and 101—C are separated by a spring 101—A and are each splined to the shaft 103 which constitutes the main drive shaft and is provided with the splined portions 103—A and 103—B, to the portion 103—A of which is splined, the high speed drive clutch 101 and 101—C.

A sleeve shaft 110 is revolvably mounted over the tube 112 which has a sliding fit on the drive shaft 103, said tube abutting the member 101—C of the high speed clutch at one end and at the opposite end carrying the thrust ball bearing 241—A which is arranged to be engaged by a suitable operating yoke to cause longitudinal movement of the tube 112 to operatively connect the parts 101—101—C of the high speed clutch to directly drive the shaft 103. The sleeve 110 is provided at one of its ends with the gear teeth 111 and splined at its opposite end as at 110—C to receive the parts 102, 102—C of the first and second speed and reverse drive clutch, which are normally maintained in separated relation by the spring 102—A. The part 102—C of the clutch combination is itself extended to provided a clutch sleeve 113 upon which is mounted the thrust ball bearing 240—A which is also arranged to be engaged by a suitable yoke so that the part 102—C of the clutch combination can be moved into engagement with the ring 55 and thru part 102 to provide a drive for the sleeve 110.

In the transmission casing there is also provided a countershaft 56 and revolvably mounted thereon is the countershaft sleeve 104 provided with the gear parts or sections 105 and 106 and 107. The countershaft 108 suitably journalled in the casing 50 carries the reversing idler gear 109 which is shaped to receive in the well known manner, an operating yoke to be hereinafter referred to. The gear section 105 of the countershaft sleeve 104 is arranged to mesh with the gear teeth 111 of the sleeve 110 while the gear section 106 provides for the first speed of the vehicle when the gear 114 splined as at 103—B to the shaft 103 is in mesh therewith. This gear 114, provided with the usual gear teeth, is also provided with the dog clutch teeth 116 which are arranged to engage similar dog clutch teeth in the second speed gear 115 mounted for free rotation with respect to the shaft 103. The gear 114 is provided with yoke engaging means whereby it also may be moved for change in speed. The shaft 103 at its opposite end carries a suitable connecting plate 60 through the medium of which the drive may be transferred to another operating part.

In the operation of the device thus far described, direct high speed drive is obtained by moving the parts 101—C of the clutch combination against the clutch ring 54 and against the part 101 so that the drive from the fly wheel 51 is transferred through the clutch parts 101, 101—C directly to the shaft 103. First speed drive is obtained by operating the ball thrust bearing 240—A to move the sleeve 113 so that the parts 102, 102—C of the clutch combination are in operating engagement with ring 55 and are driven by the fly wheel 51, thus transferring the drive from the fly wheel to the drive sleeve 110, which in turn, transfers the drive by the teeth 111 meshing with the gear 105 to the countershaft sleeve 104. Operation of the gear 114 along the drive shaft 103 until it meshes with the gear 106 will cause drive through the shaft 103 to provide first speed. Second speed is obtained by having the dog clutch teeth 116 of the gear 114 in mesh with the clutch teeth of the gear 115 which in turn is driven from the gear portion 107 of the countershaft 104, thus driving through the gear 114 back to the drive shaft 103.

Reverse drive of the vehicle is obtained by moving the reverse idler 109 and also the gear 114 until a drive is effected between the gear 106 of the countershaft 104 through gear 109, through gear 114 to the shaft 103; thus the clutch parts 102, 102—C provide first and second speed as well as reverse speed, while the parts 101 and 101—C of the clutch combination provide for direct or high speed drive.

The operation of the gear 114 is provided by the yoke 114—A carried by the longitudinally movable shifter rod 231 which is journalled in the transmission housing and has its end disposed in position to be engaged by the depending shift lever pin 227—A which, in turn, is secured to the end of the shaft 228 suitably journalled in the housing and arranged to carry at its outer end a clutch valve cam 216, this shaft 228 being revolvable as well as movable longitudinally so that the shifter pin can be placed in the notch 61 of the bar 231 or in a similar notch in the reverse bar 232. Referring to Figure 1, it will be noted that the shifter bar 231 beyond the notch 61 in which is positioned the ball end of the shifter pin is provided with an arcuate incline 62 so that, as shown in Figure 1, when the shifter pin 227—A moves to the left, a sufficient distance, to move the bar 231 until the ball end of the shifter pin 227—A is beyond the upper edge of the notch or slot 61, said ball end will ride up on the surface 62 and permit an additional rocking movement of the cam 216 without affecting the position of the shift bar 231. The bar 232 is also provided with a similar surface 63 but disposed oppositely to the surface 62 of the bar 231 so that when the shifter pin is moved to the right and moves, the bar 232 with it until it clears the notch therein, it will ride up along the surface 63 and permit an additional revolving movement of the clutch valve cam 216 without moving the bar 232 longitudinally. The position of each of the bars 231 and 232 when this additional movement of the cam is permitted is illustrated in outline in Figure 1. The bar 232 is similar to the bar 231 and carries the yoke 109—A which slides the reversing idler 109 into engagement with the gears 106 and 114 to carry out a reverse drive of the vehicle.

Referring to Figures 2, 3, 4, and 7, there is illustrated the clutch valve cam, which, as before noted, is operated by a revolving movement of the shaft 228 and has pressed against its under surface through the medium of the push rods 212, 213, the rock levers 214 and 215 respectively which are journalled on the stud 66 at opposite sides of the free wheeling lever 229 and rod 230, the latter of which is connected with the accelerator pedal 65 in any suitable manner. A spring 65a is provided for normally holding the accelerator pedal in closed position, said spring being shown surrounding the throttle control rod 65b.

The operation of the control valve is governed by the position of the clutch valve cam 216 and the accelerator pedal 65. When the accelerator pedal is in the normal position, that is, closed throttle, the two lugs 223, 224 on the free wheeling lever 229, through engagement with the corresponding lugs 225, 226 on the rock levers 214 and 215, prevent either of the rock levers from raising and thereby opening control valve regardless of the position of the clutch valve cam 216. Therefore, both clutches 101 and 102 are always disengaged when the throttle pedal is in normal position. This disengagement of the clutches provides a free wheeling feature by preventing driving connection between the source of power and the driving shafts. Hence the lever 229 is referred to as a free wheeling lever. The clutch valve cam 216 is movable in two directions and this motion is controlled entirely by the shifter lever pin 227—A and shifter lever shaft 228. Manual movement of the shifter lever 227, see Figure 2, to the right or left slides the shifter lever shaft 228 to the left or right which brings the depressed faces of the clutch valve cam 216 into or out of longitudinal alignment with the rock levers 214 and 215. Fore and aft manual movement of the shift lever rotates the clutch valve cam 216 with shifter lever shaft 228 which brings the cam faces on 216 into or out of contact with the rock levers 214 or 215 depending upon the particular lateral position of the cam. In this manner manual control of the control valve is obtained. The particular speed controlled by each face on clutch valve cam is designated on the drawings, Figure 2, in which the points indicated by the numeral 70, 71, 72 and 73, are the faces or the depressed portions which operate the levers 214 or 215 to give high speed, first speed, reverse speed and second speed, respectively. For the purposes of speed control over the countershaft sleeve 104 while changing speeds or to make it possible to spin the countershaft sleeve 104 for easy engagement of the gears when the car is not moving, a depressed face 216—E is formed on the clutch valve cam 216 which engages clutch 102 through the medium of the mechanism to be described and which is controlled by the rocker lever 215 when moving from first to second speed thus giving effect to a double clutching action. Lateral and longitudinal movement of the shifter lever 227 selects the gear and further longitudinal movement of the lever 227 opens or closes the control valve. In lateral movement lever 227 engages the shifter rods 231 and 232, and longitudinal action moves the sliding gears 114 on the main shaft 103 and reverse gear 109. The shifter rods carry the forks 109—A and 114—A which engage the sliding and reverse gears.

The mechanism for operating the clutches as controlled by the levers 214, 215 includes the plunger pump 202, (see Figure 2), housed in a suitable cylinder 202—A formed in the casing and supported on the spring 75 and also resisting the action of the spring 76 which holds in place a ball check valve 203 so that intake of oil is permitted from the sump 204 formed in the casing, through the passage 203—A into the plunger chamber 203—C from whence it is forced out through the passage 203—E into the pressure chamber 206 in which air has been pocketed to form an air cushion 206—A. A suitable check valve 205 is positioned between the passage 203—E and the pressure chamber 206, the pressure on the check valve, which is of ball formation, being kept through the medium of the spring 205—A and threaded plug 205—E. The oil pressure chamber 206 opens into a passage 207 which connects with the control valve plunger chambers 210—E and 211—E, (see Figure 1), in which are disposed the plungers 210—A and 211—A, respectively. Each of the plungers 210—A and 211—A are provided with the diametrically disposed vertical slots 222 and 222—A respectively and are each mounted on the springs 77 operating against the ball valves 211—B and 210—B which are positioned in the chambers 210—E and 211—E respectively to admit oil under pressure from the passage 207 when the pressure is removed or decreased from either of the springs 77 by the raising of the plungers 210—A or 211—A which movement is permitted by operation of either of the levers 214 or 215 being forced into the various cam seats of the clutch valve cam 216. The upward movement of the plungers 210—A or 211—A is transmitted to the levers 214 or 215 through the medium of the lifter rods 212—E or 213—E engaging the lever push rods 212 and 213, the push rod 212 engaging the lever 214 while the push rod 213 engages the lever 215. The chambers 210—E and 211—E are closed through the medium of suitable bushings and connect with adjacent clutch operating plunger cylinders 219—A and 220—A through the medium of the bores 78 into which extend the threaded studs 79 constituting chokes or choke plugs which are adjustably threaded in the bottom cover plate 204—C which closes the sump space 204 and which carries the control valves and operating plungers all in one casting which bolts to the transmission housing. With this construction any leakage from the plungers or control valves flows directly into the sump space. This also eliminates the necessity for piston rings on the plungers and makes the entire mechanism very compact and accessible. The end of the oil pressure passage beyond the ball check valves 210—B and 211—B is closed by the relief ball valve 208 which is seated by pressure from the spring 208—A but yields at a predetermined pressure to permit the oil to flow past the ball valve 208 through the relief valve passage 209 and back into the sump space 204. The pump plunger 202 is operated by the fly wheel cam 201.

In each of the clutch operating plunger cylinders 219—A and 220—A there is positioned respectively, a first and second speed clutch operating plunger 219 and a high speed clutch operating plunger 220 each being provided with an air cushion pocket 80 in its lower end. Oil admitted under pressure through either of the ball valves 210—B or 211—B to either of the chambers 219—A or 220—A will operate either of the plungers 219 or 220 depending upon the position of the cam 216. These plungers operate respectively the push rods 219—E, 220—E, the rod 219—E operating the clutch operating lever 217 while the rod 220—E operates the clutch operating lever 218. Both these clutch levers are pivoted on the stud 233. The lever 218 through a push rod 237 operates a bell crank 238 pivoting with stud 239 which in turn operates a fork or yoke 241 to move the high speed clutch bearing 241—A to permit high speed drive through shaft 103.

The lever 217 turns the bell crank 234 through engagement with lug 235. The bell crank 234 turns pin 236 and operates the fork or yoke 240 which bears against the thrust bearing 240—A to afford driving connection between the parts of the first, second and reverse speed clutch. The rate of application of the clutches is controlled by the hand lever 227 through the partial or full opening of the control valves and through this medium the clutch may be slipped, or partially applied.

Suitable drain openings 210—H are provided in each of the chambers 210—E, 211—E to permit expulsion of the liquid from said chambers into the sump chamber 204, when the cam 216 is operated to depress the plungers 210—A or 211—A.

A modified form of my invention is illustrated in Figures 8 and 9, the transmission incorporated in the modification being particularly adapted to the use of five speeds as employed in the design of buses and trucks. In this form of my invention there are five forward speeds and two reverse speeds. There is only one mechanical shift between second and third speed which involves engaging gear 304 with gear 312 through the jaw clutch 312—A. In all speeds, the various ratios are obtained through engagement of one of the three clutches. The engagement and disengagement of the clutches is controlled by the hydraulic mechanism shown diagrammatically in Figure 9.

Referring to the hydraulic mechanism, a gear pump 320 driven in any suitable manner from the engine, draws oil from a supply chamber 321 and pumps it into a pressure chamber 322 in the upper portion of which is provided an air cushion 323. This oil is forced into the pressure chamber at a pressure of between 35 and 40 pounds per square inch. A pressure release valve is provided in a suitable by-pass 324, the pressure release valve being indicated by the numeral 325 and the pressure at which it operates being adjusted in the usual manner through the medium of a spring and set screw.

From the pressure chamber, the oil flows through the foot clutch valve chamber 326 and the selector valve 334 to the expandible bellows 328, one being employed as at 328 to operate the push rod for manipulation of the third and first speed clutches. The bellows 329 operate the second and fourth speed clutches and the bellows 330 operate the fifth speed clutch providing direct drive. The clutch valve 327 is cylindrical and acts as a plunger within the valve cylinder 326 and is provided with the side groove 331 which affords passage of the liquid under pressure to the selector valve 334. The selector valve comprises the casing 332 which is connected through the medium of the pipe 333 to the oil supply tank and by the pipe 334—A is connected to the clutch valve chamber 326. In this selector valve housing, there operates a selector valve plunger 334. Each of the bellows 328, 329, and 330 are connected through the medium of their respective pipes 335, 336, and 337 to the selector valve chamber 332. The selector valve 334 is provided with suitable grooves so that oil may flow from the pipe 334—A to any one of the bellows pipes 335, 336 or 337 depending upon the position of the selector valve plunger 334. The position of the valve 334 is regulated by the gear change or selector lever 338. The selector valve 334 is also provided with openings 339 which permit flow of the oil or drain thereof from the bellows not under pressure back to the oil supply tank.

The foot valve performs the same function as the ordinary clutch pedal. By pushing the pedal down, which is indicated by the numeral 340, the clutch which is engaged is released and by letting it up, the clutch can be gradually engaged. This valve holds a ball valve 343 on its seat by spring pressure, thus resisting the flow of oil to the selector valve. As the valve is raised, the spring pressure is released from the ball and allows the oil pressure in the bellows to increase. If the valve is pushed down until the upper groove 341 therein connects the passage 334—A with the passage 342 which leads back to the oil supply tank, the oil flows out of the bellows and releases the clutch. In driving the truck, the foot valve is used only for maneuvering when the truck is to be moved a short distance at a time or in making a very gradual start. It is not touched during normal driving. For starting, the selector lever 338 can be moved directly into the first speed position without touching the pedal. In order that the clutches may be eased in, use is made in the pipes 335, 336, and 337 connecting the selector valve with the respective bellows, of chokes 370, 371, and 372 which are in the nature of set screws which may be threaded into the pipes to block the passage thereof so that the pressure is admitted easily to the bellows 328, 329, and 330.

In connection with all of the bellows, there is employed, an air cushion 373 but only illustrated in connection with bellows 329, this air cushion being provided by the air caught in the bellows when the oil or other fluid under pressure is forced into the bellows, this air cushion also providing ease of operation of the clutches and gives the gradual throw-in of the clutch that avoids jarring in starting the vehicle.

In Figure 8, illustration is made of the bellows 328 in its relation to the transmission mechanism, it being understood that all of the bellows 328, 329 and 330 are disposed so as to move through the push rods 330—A, the yokes 350, 351, and 352, respectively, the yokes 350 and 351 being arranged to move longitudinally the shafts 353 and 354 respectively to cause operation of the clutches 310 and 311 respectively. The clutch 310 is employed for the purpose of providing first speed and also third speed while the clutch 311 is employed to obtain second and fourth speed. The clutch 313 operated by the yoke 352 and by bellows 330 is employed to give fifth speed as direct drive.

It is to be noted that all of the sylphon bellows and the valves are to be carried on a casting bolted to the side of the clutch housing 358, the clutch housing to act as a sump for the hydraulic fluid.

First speed, as all other speeds, except direct drive, is obtained from the fly wheel 360 operating through the toothed disk 313—A to drive the sleeve 361 mounted on the drive shaft 362 and provided with the gear 301 which in meshing with the gear 302 carried on the countershaft 363 and fixed thereto, operates said shaft 363 and through the clutch 310 when the same is actuated by the means previously described, drives through the countershaft sleeve 364 to operate gear 304 splined on the shaft 362 and movable through the medium of a suitable yoke 362—E, to mesh with the gear 303 formed as an integral part of the countershaft sleeve 364. This countershaft sleeve also carries the gear 309 as an integral part thereof but the operation of the gear 303 with the gear 304 serves to drive the shaft 362 thus providing first speed. The gear 312 mounted loosely on the shaft 362 engages the gears 307 and 309 to provide in combination with the sleeve 364, and gear 304, the second speed drive. When the clutch 311 is operated by the bellows 329 it provides drive through the clutch 311 by shaft 365, to which is keyed the gear 306 which meshes with gear 305 formed on the sleeve 361. Second speed is obtained by a drive through the members 313—A, 361, 305, 306, 365, 307, 312, 309, 364, 303, 304, and 362.

Third and fourth speeds are provided in the same manner as the first and second speeds but with the jaw clutch 312—A and 312—B engaged, the third speed being provided by the sliding gear 304 on the main shaft engaged with gear 312 through the teeth of the jaw clutch or gear 312, the teeth being indicated by the numeral 312—A. The power then flows from the fly wheel through the gears 301, 302, 309, 312, 304 to the main shaft 362 with the clutch 310 engaged.

For fourth speed, the power flows through the gears 305, 306, 307, 312, 304 to the main shaft 362 with the clutch 311 engaged.

The gear change or selector lever 338 is mounted on the shaft 375 which is journalled for rocking and longitudinal movement in suitable supports 376, the shaft 375 carrying the arm 377 which engages the upper end of the selector valve 334 so that a rocking movement of the shaft 375 will raise and lower the selector valve 334. The shaft 375 also carries the spool 378 which operates the rocker lever 379 which in turn, engages a yoke 362—E mounted for sliding movement on a countershaft 380.

Fifth or direct drive is obtained by engagement of the clutch 313 to drive directly through the shaft 362. Reverse drive is obtained by shifting reverse gear 304—E to mesh with 303 and 304 which are disengaged from each other by slight movement of 304.

My invention is not to be restricted to the precise details of construction shown since various changes and modifications may be made therein without departing from the scope of the invention or sacrificing the advantages derived from its use.

What I claim is:—

1. In a transmission, a driving member, drive shafts, clutches for operatively connecting said member and shafts, means for actuating the clutches including members having expansible chambers, a source of fluid pressure, means for admitting the fluid under pressure to the expansible chambers to actuate the clutches including a single control member, and a choke for controlling the rate of application of the fluid to the expansible chambers.

2. In a transmission, a driving member, a drive shaft, a clutch for operatively connecting said member and shaft, means for actuating the clutch including an expansible member having an air cushion bore therein, means for admitting fluid under pressure to the clutch actuating means, means for controlling the rate of clutch actuation, and other means for altering the rate of clutch actuation.

3. The combination with a selective gear transmission having a driving shaft and a driven shaft, a plurality of change speed gears interposed between said driving and driven shafts and means for shifting at least one of said gears to effect different gear ratios between said driving and driven shafts, a pair of clutches one for establishing direct driving relationship between said driving and driven shafts and the other for establishing driving relationship between said shafts through said change speed gears, means for actuating said clutches and a single manually operable control member for controlling said clutch actuating means and said gear shifting means.

4. In a transmission, a driving shaft and a driven shaft, a speed change gear mechanism interposed between said driving and driven shafts and a pair of clutches one for establishing driving connection directly between said driving and driven shafts and the other for establishing said connection through said gear changing mechanism, fluid pressure actuated means for engaging said clutches, means for shifting the speed change mechanism to establish different gear ratios between said driving and driven shafts, a manually operable lever for selective engagement with said gear shifting means, means for controlling the flow of fluid to said fluid actuated means and means connected with said lever for engagement with said fluid pressure control means to cause the gear shifting and clutch engaging operations to be effected in sequence.

5. The combination with a sliding gear transmission for an automotive vehicle having a driving shaft and a driven shaft, a plurality of change speed gears interposed between said driving and driven shafts and a manually operable gear shift lever for selectively establishing connection of different gear ratios of a pair of clutches one for establishing direct driving connection between said driving and driven shafts and the other for establishing driving connection through said change speed gears, fluid pressure actuated means for engaging said clutches, a source of fluid under pressure, means for establishing communication between said source and said fluid pressure clutch actuating means and means connected with said gear shifting lever to actuate said fluid pressure controlling means.

6. In a fluid pressure actuated change speed transmission including a driving shaft and a driven shaft and clutch means for connecting said shafts in operative driving relationship, fluid pressure actuated means for causing engagement of said clutch means, a pump for supplying fluid under pressure to said fluid pressure actuated means and means for preventing jerky clutch engagement including cushioning means in said fluid pressure actuating means and a choke interposed between said pump and said cushioning means.

7. In a fluid pressure actuated change speed transmission including a driving shaft and a driven shaft and clutch means for connecting said shafts in operative driving relationship, fluid pressure actuated means for causing engagement of said clutch means, a pump for supplying fluid under pressure to said fluid pressure actuated means and means for preventing jerky engagement of said clutch means comprising a reservoir connected with said pump for maintaining a reserve supply of fluid under pressure, means communicating with said reservoir to compensate for rapid volumetric variations of the fluid contents under pressure therein, connections between said pump and said fluid pressure actuating means communicating with the latter below the top thereof to insure the trapping of a volume of air in said fluid pressure actuated means to provide an air cushion immediately adjacent to said clutch actuating means and a choke interposed between said pump and fluid pressure actuated means to prevent too rapid building up of pressure therein.

8. In a fluid pressure actuated change speed transmission, a driving shaft and a driven shaft, means for establishing a plurality of different driving ratios between said driving and driven shafts including clutch means, fluid pressure actuated means for operating said clutch means, a manually operable control member interposed between said source of fluid pressure and said fluid pressure actuated means for selectively rendering said different speed ratios effective and means including said control member for varying the pressure of the fluid delivered to said fluid pressure actuated means from said source.

9. The combination with an automobile having a throttle controlled engine, of a fluid pressure actuated change speed transmission, a driving shaft and a driven shaft, means for establishing a plurality of different driving ratios between said driving and driven shafts including clutch means, fluid pressure actuated means for operating said clutch means, a manually operable control member interposed between said source of fluid pressure and said fluid pressure actuated means for selectively rendering said different speed ratios effective and connections between said control member and the throttle of said engine for automatically shutting off and releasing the pressure being delivered to said fluid pressure actuated means whenever said throttle is moved to closed position, thereby to establish a free wheeling condition.

10. In a fluid pressure actuated change speed transmission, a driving shaft and a driven shaft, means for establishing a plurality of different driving ratios between said driving and driven shafts including clutch means, a source of fluid pressure, fluid pressure actuated means for operating said clutch means, a control member interposed between said source of fluid pressure and said fluid pressure actuated means for selectively rendering said different speed ratios effective and means including said control member for varying the pressure of the fluid delivered to said fluid pressure actuated means from said source.

11. The combination with an automobile having a throttle controlled engine, of a fluid pressure actuated change speed transmission comprising a driving shaft and a driven shaft, means for establishing a plurality of different driving ratios between said driving and driven shafts including clutch means, a source of fluid pressure, fluid pressure actuated means for operating said clutch means, a control member interposed between said source of fluid pressure and said fluid pressure actuated means for selectively rendering said different speed ratios effective and connections between said control member and the throttle of said engine for automatically shutting off and releasing the pressure being delivered to said fluid pressure actuated means whenever said throttle is moved to closed position, thereby to establish a free wheeling condition.

12. In a transmission, a driving shaft, a driven shaft, clutch means for connecting said shafts in operative driving engagement, fluid pressure actuated clutch engaging means including means of resilient effect to produce gradual increase in clutch pressure in accordance with the amount of fluid transmitted thereto, and means for regulating the rate of flow thereby to regulate the rate of clutch engagement.

13. An automatic fluid pressure controlled change speed transmission for an automobile having a throttle controlled engine and a manually operated device for actuating said throttle, characterized by a plurality of fluid pressure operated clutches for selectively making different gear ratios effective, a pump for supplying fluid under pressure to said clutches, a pressure control valve for governing the pressure of the fluid delivered by said pump to said clutches, and connections between said pressure control valve and throttle actuating member for regulating the extent of opening of said pressure control valve and thereby the pressure of the fluid delivered to said clutches in accordance with the extent of throttle opening.

14. An automatic fluid pressure controlled change speed transmission for an automobile having a throttle controlled engine and a manually operated device for actuating said throttle, characterized by a plurality of fluid pressure operated clutches for selectively making different gear ratios effective, a pump for supplying fluid under pressure to said clutches, a pressure control valve for governing the pressure of the fluid delivered by said pump to said clutches, and connections between said pressure control valve and throttle actuating member for regulating pressure of the fluid delivered to said clutches in accordance with the extent of throttle opening.

WILLIAM T. LIVERMORE.